April 1, 1930. E. S. HENRY Re. 17,630

STEAM SCORING MACHINE FOR ICE

Original Filed Aug. 20, 1928

INVENTOR

Earl S. Henry,

BY

Emery, Booth, Varney, & Malcolm

HIS ATTORNEYS

Reissued Apr. 1, 1930

Re. 17,630

UNITED STATES PATENT OFFICE

EARL S. HENRY, OF MEDFORD, OKLAHOMA

STEAM SCORING MACHINE FOR ICE

Original No. 1,737,308 dated November 26, 1929, Serial No. 300,780, filed August 20, 1928. Application for reissue filed January 13, 1930. Serial No. 420,618.

My invention relates to devices for scoring or marking blocks of ice.

The objects of my invention are to provide an apparatus of this character which is new, novel, efficient, useful, comparatively inexpensive to construct and operate and which is of utility; to provide an improved device which utilizes the heat of steam in scoring; to provide an improved machine which eliminates all motors, gears, drive chains, shafts, saws and the like; to provide an improved machine which takes the blocks of ice on edge, completes the scoring in one operation and delivers the block on edge, there being no necessity of turning the block on end, to provide an improved device which requires but one trip of the said block through the machine to effect the scoring; both the lengthwise and crosswise scoring being accomplished at the same time; other and further objects being made manifest hereinafter as the description of the invention progresses.

Most scoring machines in use prior to my invention employ sets of gang saws, one set for lengthwise and another set for crosswise scoring. The sets of saws do not operate simultaneously. After the block of ice passes one of said sets of saws it must be turned before passing the second set. This requires a machine with a long supporting frame, the sets of saws being in opposite ends thereof, a turning space therebetween and complicated mechanical accessories to accomplish the scoring, and in addition a motor or other driving means. In my invention the machine is approximately one third as large, the saws are replaced by tubular gridirons containing live steam, the said gridirons being forced into the block of ice by weights actuated by gravity or other means supplementing the control of the operator whereby semi-automatic functioning of the machine results and the machine may be readily and safely used by an inexperienced operator, the machine requiring no motor or other similar driving means.

My invention consists in the novel construction and arrangement of parts hereinafter described, portrayed in the accompanying one-sheet drawing, and particularly pointed out in that portion of this instrument wherein patentable novelty is claimed for certain distinctive and peculiar features of the device, it being understood that the said drawings are illustrative and not restrictive, and that within the scope of what hereinafter is thus claimed, various changes in the form, size, proportions and minor details of the structure may be made, without departing from the spirit or sacrificing any of the advantages of the invention.

Like characters of reference designate like parts in all of the figures.

In the drawings Figure 1 is a side elevational view of the machine;

Figure 1:
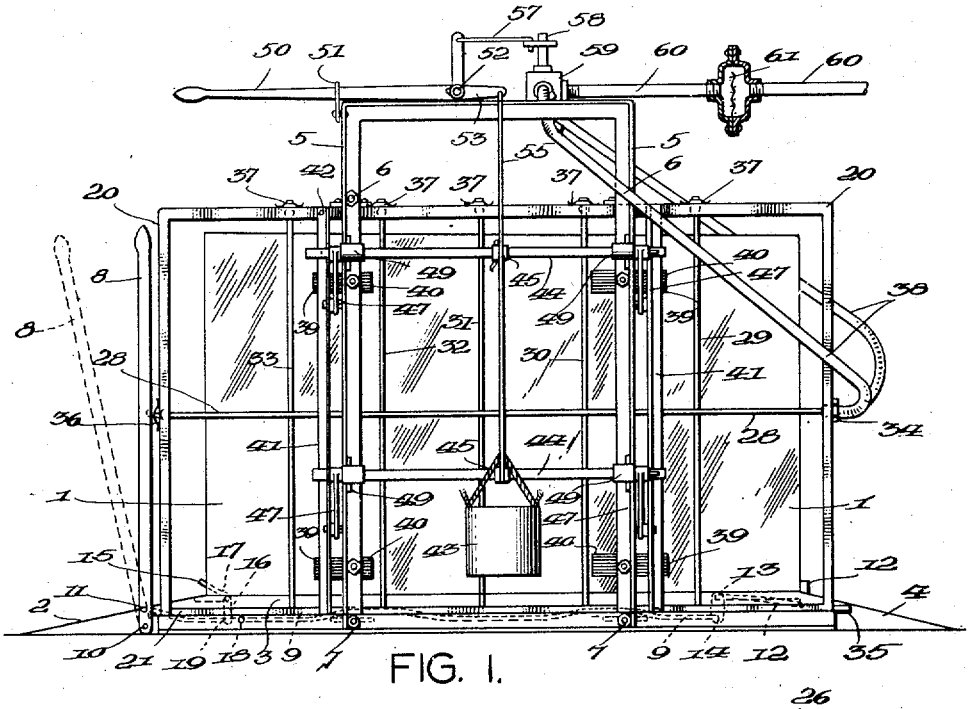
Figure 2:
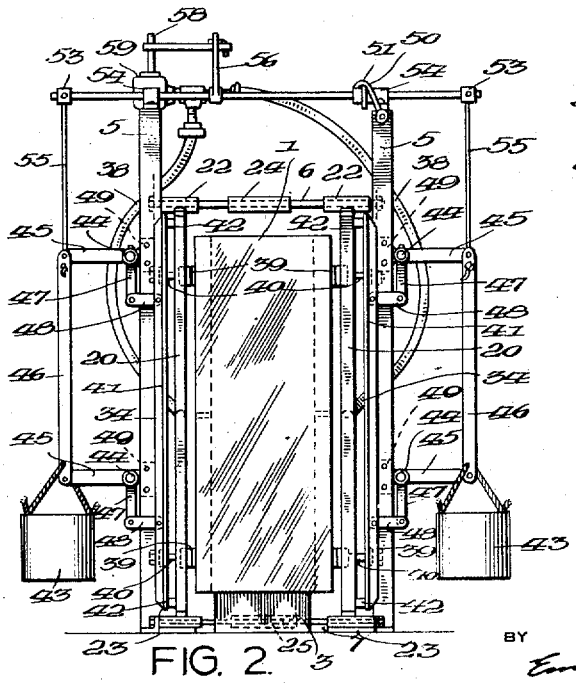
Figure 2 is an end elevational view with the ejecting mechanism omitted.

One embodiment of my invention is shown as follows:

In the drawings 1 represents a block of ice placed on edge, upward incline 2 assists in placing said block 1 upon supporting base 3 said base being as long as block 1 but not so wide as said block 1. Downward incline 4 assists in discharging the block from the machine after the scoring is completed. The main side supporting frames 5, preferably made of angle irons, are rectangular in shape, their greater dimensions being upstanding, said frames 5 are connected in proper spaced relationship by upper cross rods 6 and lower cross rods 7.

Figure 3:
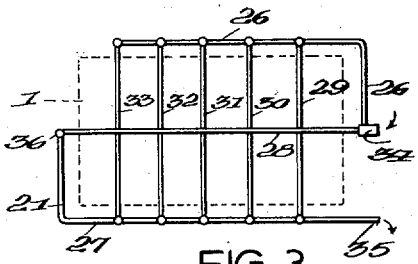
Figure 3 is a side view of the tubular gridiron, with a dotted outline of a block of ice thereon.
Figure 4:
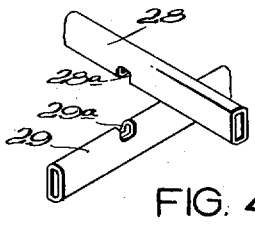
Figure 4 is a fragmentary perspective view showing the method of joining the gridiron tubes.

Stop and ejector hand lever 8 is pivoted at 10 to supporting base 3, and rod 9 is pivoted to hand lever 8 at 11. Rod 9 is placed alongside base 3 and under block 1, said rod 9 operates to position a bell crank stop 12 at the front of said block 1 when hand lever 8 is in the position indicated in solid outline. Bell crank 12 is pivoted to base 3 at 13 and to rod 9 at 14. I provide an ejector plate 15 at the rear of block 1, having lever arm 16 pivoted to base 3 at 17, an ejector collar 18 rigidly attached to rod 9 operates to lift said plate 15 and block 1 when hand lever 8 is in the position indicated by the dotted outline, in which position rod 9 operates to release stop 12 from in front of said block 1 and permits block 1 to move down incline 4 and out of the machine. Retrieving collar 19 on rod 9 operates to return said plate 15 into retrieved position ready for the passage thereover of another block of ice. Rectangular gridiron frames 20, preferably made of angle irons, having their greater dimensions horizontal, are placed within said main side frames 5 on both sides of block 1, are slidably mounted on upper cross rods 6 by sleeve guides and supports 22 and on lower cross rods 7 by similar sleeve guides and supports 23. Mounted on said rods 6 and 7 are stationary sleeve stops 24 and 25 for respectively limiting the inward movement of sleeves 22 and 23. As can best be seen in Fig. 3 the scoring gridiron 21 formed from flattened tubes is shown detached from its supporting frame 20. The gridiron 21 consists of steam intake manifold pipe 26 and exhaust pipe 27, the said pipes 26 and 27 are horizontally connected by tube 28 and vertically connected by tubes 29, 30, 31, 32 and 33, which vertical tubes also communicate with tube 28 through approximately half lapped brazed joints 28[a] and 29[a] the details of which are shown in Fig. 4.

The said flattened scoring tubes are preferably made of brass, copper or like non-rusting material. The gridiron here illustrated would be adapted for scoring a 300 pound block of ice into 12 pieces of 25 pounds each but it is to be understood that my invention is not limited to this size block or number of pieces. Since blocks of ice are made tapering in order to remove them from the cans in which they are frozen, I provide for this, as can be seen in Fig. 1, by spacing the vertical scoring tubes farther apart at the small end of the block in order that each piece will weigh the same, in this case 25 pounds. Live steam is admitted to gridiron 21 at 34, is forced through manifold 26 and the tubes connecting therewith, is collected in manifold 27 and exhausts at 35. In order to provide for expansion and contraction in said gridiron 21 spring clip 36 on tube 28 and spring clips 37 at the upper and lower ends of the vertical tubes are placed on the anchoring means by which the said gridiron is attached to frame 20. In order that the block of ice may be centered in the machine I provide guide and spacer blocks 39 attached to frame 5 by bolts 40. Two pressure bars 51 on each side of the machine are secured to frames 20 by fastenings 42. Gravity weights 43 for pressing gridirons 21 into block 1 are articulated to pressure shafts 44 by weight levers 45 set-screwed thereto, long link 46 pivotally uniting said levers 45. Pressure levers 47 and short pressure links 48 attached to pressure bars 41 adjacent the upper and lower quarter points of said bars 41 apply the pressure of said weights 43 to gridiron frames 20 and gridirons 21 and force the gridiron tubes evenly into the block 1 from both sides to a uniform, pre-determined depth. This depth can be regulated by the lengths of sleeve guides and supports 22 and 23 and sleeve stops 24 and 25 on cross rods 6 and 7.

The depth of scores made by horizontal tubes 28 will be a little less than the scores made by the vertical tubes as the junctions of said tubes are less than half laps and said tubes 28 are on the side away from the block of ice. The pressure shafts 44 are connected to main frame 5 by bearings 49. Weight releasing and steam valve operating hand lever 50 is latched by 51 to said frame 5 and keyed to shaft 52, said shaft 52 having bearings 54 bolted to frame 5. Levers 53 set-screwed to shaft 52 are operatively connected by flexible cables 55 to weight link 46. Cables 55 are used to make it impossible for any ignorant or careless operator to break or injure the gridiron tubes by attempting to force said tubes into the block of ice as would be the case if hand lever 50 were rigidly connected to the gridiron articulations. Steam valve lever 56 is also attached to shaft 52 and through link 57 and stem 58 operates to open steam plug cock 59 and admit live steam from pipe 60 to gridirons 21 as soon as hand lever 50 is unlatched for releasing weights 43. Steam pipe gauge strainer 61 is inserted in steam pipe 60 to avoid clogging the scoring tubes by any scale or other foreign matter which might be carried through said pipe 60.

The operation of scoring a block of ice will now be explained. With hand lever 8 in the position indicated by solid lines in Fig. 1 a block of ice is slid up incline 2 and into the machine small end first, and comes to rest on base 3 and against stop 12. Hand lever 50 is released from latch 51, steam is admitted through plug cock 59 into steam hose lines 38 and thence into scoring tubes of gridirons 21. Weights 43 are released at the same time and by gravity pressure force inwardly the said gridirons 21 against the two opposite sides of said block of ice, in a few moments the hot tubes melt into the ice until brought to a stop by sleeves 24 and 25.

Hand lever 50 is hooked under latch 51, the steam is cut off, the gridirons are withdrawn from the block, ejecting hand lever 8 is pulled forward into position as shown in dotted outline in Fig. 1, stop 12 removed from in front of the block, ejector plate 15 lifts the back of the block and pushes it forward where it slides out of the machine and down incline 4, perfectly scored and ready to be cut into pieces of uniform weight. It is to be understood that both sides of the block of ice are scored alike, in perfect alinement, and to such depth that very little effort with an ice pick is needed to divide the block into pieces of any desired weight. It is to be understood that such focalization of the point of the gridiron shaped scoring portion in the way of a pointed hollow cutting edge may be made as desired since the steam heat therewithin and the gravity are the only forces that compel the gridiron to sink in the block of ice up to the point of a predetermined depth.

Having thus described a preferred embodiment of my invention what is claimed and desired to be secured by Letters Patent is:

1. A machine for scoring blocks of ice, having a base and a supporting frame defining an ice block receiving passage thereabove, a hollow gridiron manifold member supported by said frame and adapted for steam heating and for scoring said blocks to a predetermined depth, power storing means for controlling said gridiron member, and means to prevent the application of excessive force to said gridiron member during the operation of the device.

2. A semi-automatic machine for scoring blocks of ice, having a base and a supporting frame defining an ice block receiving passage thereabove, a hollow gridiron manifold member supported by said frame and mounted for movement toward and from said passage and adapted for steam heating, means for limiting the movement of said hollow gridiron manifold member toward said passage to limit the depth of scoring, and power storing means for moving said manifold member toward said passage to effect scoring of a block therein.

3. A machine for scoring blocks of ice, comprising a supporting base having inclines at both ends, side supporting frames vertically disposed, cross members for holding said frames in proper spaced relation, guides on said frames for properly positioning said block on said base between said frames, means for stopping said block on said base and means for releasing said stop and ejecting said block from said machine, and steam heated hollow gridiron scoring frames adapted for oppositely and simultaneously being sunk by heat and the action of power storing means included in the machine a predetermined distance in said blocks of ice.

4. A machine for scoring blocks of ice, comprising a first set of side supporting frames, means for holding said supporting frames in proper spaced relation, a supporting base for said block between said supporting frames, a guide anchored on said frames for centering said block in said machine, means for stopping said block in position to be scored and means for ejecting said block from the machine, a second set of frames positioned within and co-acting with said supporting frames, scoring gridirons consisting of flattened metallic tubes supported by said second set of frames, means for admitting live steam into said gridiron, means for applying pressure to said steam-filled gridirons as they melt into said block of ice, and means for withdrawing said gridirons from said block.

5. A machine for scoring blocks of ice, comprising a first set of side supporting frames, means for holding said supporting frames in proper spaced relation, a supporting base for said block between said supporting frames, guides anchored on said frames for centering said block in said machine, a lever on said base for controlling stop and ejector means for said block, a second set of frames positioned within and co-acting with said supporting frames, scoring gridirons consisting of flattened metallic tubes for transversely and longitudinally scoring said block supported by said second set of frames, steam intake and exhaust manifolds connecting with said transverse and longitudinal scoring tubes, means at the connections of said gridirons to said frames providing for unequal expansion thereof with changes in temperature, and stop means on the said spacing means for regulating the depth of the scoring of said blocks.

6. A machine for scoring blocks of ice, comprising a first set of side supporting frames, means for holding said supporting frames in proper spaced relation, a supporting base for said block between said supporting frames, guides anchored on said frames for centering said block in said machine, a lever on said base for operating stop and ejector means for said block, a shaft supported by said first set of frames, a second lever attached to said shaft for releasing pressing weights and operating a steam plug cock simultaneously, a steam plug cock for controlling steam to hose connecting steam scoring gridirons, a second set of frames positioned within and co-acting with said first set of frames, scoring gridirions supported by said second set of frames, a plurality of weights having co-acting means for transmitting inward pressure to said gridirons, flexible means for connecting said second lever with said weights for preventing said gridirons from being forcibly pressed into said blocks, and permitting gravity and heat only to control them.

7. In a machine for scoring blocks of ice having a base and a supporting frame extending thereabove and defining an ice block receiving space, steam heated scoring grids positioned to score the opposite faces of an ice block in said space, power storing means for urging said grids toward each other, means for retracting said grids against the influence of said power storing means, and a valve for controlling the flow of steam to said grids connected to said last named means to be operated thereby.

8. In a machine for scoring blocks of ice having a base and a supporting frame extending thereabove and defining an ice block receiving space, steam heated scoring grids positioned to score the opposite faces of an ice block in said space, power storing means for urging said grids toward each other, means for retracting said grids against the influence of said power storing means, but inoperable to force said grids in the opposite direction, and a valve for controlling the flow of steam to said grids connected to said last named means to be operated thereby.

9. In an ice scoring machine provided with a base and a frame having scoring means mounted therein and defining a passage for an ice block, a stop member normally positioned in said passage to stop a block of ice in position to be scored, an ejector member normally positioned to avoid interference with the block of ice as it enters said machine, and a means for retracting said stop member from the path of the ice block and operating said ejector member to eject said block from the machine.

10. In a machine for scoring blocks of ice provided with a base and a frame having scoring means mounted therein and defining a passage for an ice block, a stop member normally positioned in said passage to stop a block of ice in position to be scored by contact against one end of the block, and an ejector comprising a lifting member positioned in said base to lift the other end of the block when operated, and a common operating means for retracting said stop member and raising said ejector member.

11. A semi-automatic ice scoring machine comprising a frame, opposed steam heated scoring members carried by said frame and spaced apart to define an ice block receiving space, means tending to advance said scoring members toward each other, mechanism operable to retract said scoring members against the action of said means, means for releasably holding said mechanism in position to maintain said scoring members retracted, a conduit for conducting heating fluid to said scoring members, and a valve interposed in said conduit and interconnected with said mechanism to be actuated thereby to cut off the flow of heating fluid when said scoring members are held retracted and to establish the flow of heating fluid when said scoring members are released by release of said mechanism.

12. In a machine for scoring blocks of ice having a base and a supporting frame extending thereabove and defining an ice block receiving space, steam heated scoring grids positioned to score the opposite faces of an ice block in said space, means for moving said grids toward and away from each other, and a valve controlling the flow of steam to said grids connected to said last named means to be operated thereby.

13. A semi-automatic ice scoring machine comprising a frame, opposed steam heated scoring members carried by said frame and spaced apart to define an ice block receiving space, means tending to advance said scoring members toward each other, mechanism operable to retract said scoring members against the action of said means but inoperable to force said scoring members in the opposite direction, means for releasably holding said mechanism in position to maintain said scoring members retracted, a conduit for conducting heating fluid to said scoring members, and a valve interposed in said conduit and interconnected with said mechanism to be actuated thereby to cut off the flow of heating fluid when said scoring members are held retracted and to establish the flow of heating fluid when said scoring members are released by release of said mechanism.

In testimony whereof, I have signed my name to this specification.

EARL S. HENRY.